(12) United States Patent
Kang et al.

(10) Patent No.: US 9,680,335 B2
(45) Date of Patent: Jun. 13, 2017

(54) APPARATUS FOR TRANSMITTING AND RECEIVING WIRELESS POWER

(71) Applicant: SAMSUNG ELECTRO-MECHANICS CO., LTD., Suwon-si, Gueonggi-Do (KR)

(72) Inventors: Joo Rak Kang, Suwon-si (KR); Chul Gyun Park, Suwon-si (KR); Jae Jun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 421 days.

(21) Appl. No.: 14/280,084

(22) Filed: May 16, 2014

(65) Prior Publication Data

US 2015/0180284 A1 Jun. 25, 2015

(30) Foreign Application Priority Data

Dec. 20, 2013 (KR) .................. 10-2013-0160520

(51) Int. Cl.

| | | |
|---|---|---|
| *H02J 50/10* | (2016.01) | |
| *H02J 50/12* | (2016.01) | |
| *H02J 50/80* | (2016.01) | |
| *H02J 17/00* | (2006.01) | |
| *H02J 7/02* | (2016.01) | |
| *H04W 4/00* | (2009.01) | |
| *H02J 7/00* | (2006.01) | |

(52) U.S. Cl.
CPC ............ *H02J 17/00* (2013.01); *H02J 7/025* (2013.01); *H04W 4/008* (2013.01); *H02J 2007/0096* (2013.01)

(58) Field of Classification Search
CPC .. H02J 17/00; H02J 7/025; H02J 50/10; H02J 50/12; H02J 50/80; H04W 4/008; H04B 5/0025–5/0093; B60L 11/182; B60L 11/1829–11/1831; Y02T 90/122; H01F 38/14; H01F 2038/143–2038/146
USPC ........................................... 307/104; 320/108
See application file for complete search history.

(56) References Cited

U.S. PATENT DOCUMENTS

| | | | | |
|---|---|---|---|---|
| 2011/0156640 | A1* | 6/2011 | Moshfeghi | H02J 7/025 320/108 |
| 2012/0306284 | A1* | 12/2012 | Lee | H02J 17/00 307/104 |
| 2013/0026981 | A1* | 1/2013 | Van Der Lee | H02J 5/005 320/108 |

FOREIGN PATENT DOCUMENTS

| | | |
|---|---|---|
| KR | 10-2010-0101470 A | 9/2010 |
| KR | 10-2013-0094356 A | 8/2013 |
| WO | 2010/028092 A1 | 3/2010 |

* cited by examiner

*Primary Examiner* — Rexford Barnie
*Assistant Examiner* — Thai Tran
(74) *Attorney, Agent, or Firm* — NSIP Law

(57) ABSTRACT

An apparatus for transmitting and receiving wireless power may include: a transmission module receiving power from an external device to charge a battery; a reception module providing power from the battery to the external device; a switching unit performing switching so as to select the transmission module or the reception module; a switching control unit performing Bluetooth communications with the external device and controlling the switching of the switching unit; and a host control unit creating operating mode information so as to provide the operating mode information to the switching control unit. The switching control unit may perform Bluetooth communications with the external device so that data is transmitted or received depending on the operating mode.

11 Claims, 6 Drawing Sheets

APPARATUS FOR TRANSMITTING AND RECEIVING WIRELESS POWER

CROSS-REFERENCE TO RELATED APPLICATION

This application claims the benefit of Korean Patent Application No. 10-2013-0160520 filed on Dec. 20, 2013, with the Korean Intellectual Property Office, the disclosure of which is incorporated herein by reference.

BACKGROUND

The present disclosure relates to an apparatus for transmitting and receiving wireless power.

Recently, ultra slim mobile phones and personal portable electronic devices equipped with a large amount of features have been released onto the market. It is essential for such personal portable electronic devices to have power sources such as batteries for operations thereof. Therefore, attention is increasingly being paid to usage time and the charging of batteries in personal portable electronic devices.

In this regard, in order to provide a higher degree of freedom to users when charging personal portable electronic device batteries, wireless charging technology has recently been under development by mobile phone manufacturers. Wireless charging technology can mainly be classified as a microwave reception scheme that uses microwaves, a magnetic induction scheme that uses a magnetic field, and a magnetic resonance scheme that uses energy conversion between a magnetic field and an electric field.

The microwave reception scheme has an advantage in that microwaves are emitted into the atmosphere using an antenna so that power can be transmitted for a substantial distance. However, such a power transmission scheme has a very large radiation loss in the atmosphere and thus has poor efficiency in power transmission.

Technological standardization groups for magnetic induction scheme and the magnetic resonance schemes exist. The magnetic induction scheme is being developed for public use with standards and interoperability by the wireless power consortium (WPC), while the magnetic resonance scheme is being developed for public use with standards and interoperability by the alliance for wireless power (A4WP). The magnetic induction scheme uses a resonant frequency between 100 KHz and 282 KHz, and the magnetic resonance scheme uses a resonant frequency between 6.78 MHz and 13.56 MHz.

In the magnetic resonant scheme, the degree of freedom in terms of space and location of a transmitting device and a receiving device can be increased because power transmission is induced by magnetic resonance. That is, user convenience can be improved since it is not necessary to accurately locate a transmitting device on a receiving device, and a number of receiving devices can be charged simultaneously.

However, the battery in a wireless power charging transmitting device may also be discharged, so that it also has to be charged with power from another transmitting device. Therefore, a single device capable of both transmitting and receiving wireless power is required. In addition, a device is required that can transmit data to and receive data from a number of receiving devices using wireless communications so as to provide various services.

Patent Document 1 relates to bidirectional wireless power transmissions, and discloses rectifying an induced current received at an antenna to create DC power and inducing resonance with the antenna in response to the DC power. However, Patent Document 1 does not disclose wireless power transmission/reception using magnetic resonance and using a predetermined wireless communication scheme to control it, as taught by the present disclosure.

RELATED ART DOCUMENT (Patent Document 1) Korean Patent Laid-Open Publication No. 2013-0094356

SUMMARY

An aspect of the present disclosure may provide an apparatus for transmitting and receiving wireless power capable of transmitting wireless power to an adjacent device and receiving wireless power from an external device by way of performing wireless communications with an adjacent device using a predetermined wireless communications scheme and determining whether wireless power transmission is necessary.

According to an aspect of the present disclosure, an apparatus for transmitting and receiving power may include: a transmission module receiving power from an external device to charge a battery; a reception module providing power from the battery to the external device; a switching unit performing switching so as to select the transmission module or the reception module; a switching control unit performing Bluetooth communications with the external device and controlling the switching of the switching unit; and a host control unit creating operating mode information so as to provide the operating mode information to the switching control unit, wherein the switching control unit performs Bluetooth communications with the external device so that data is transmitted or received depending on the operating mode.

The apparatus may further include: a resonant coil unit receiving power from an external device or transmitting power to an external device using magnetic resonance.

The apparatus may further include: a matching circuit unit disposed between the switching unit and the resonant coil unit, the matching circuit unit adjusting impedance of the power provided from the resonant coil unit to the power to the reception module or adjusting impedance of the power provided from the transmission module to provide the power to the resonant coil unit.

The transmission module may receive power from an external device using magnetic resonance, and the reception module may provide power to an external device using magnetic resonance.

The operating mode information may indicate a transmission mode in which power is received from an external device to charge the battery or a reception mode in which the power from the battery is provided to an external device.

The switching control unit may include: a control unit checking the operating mode information received from the host control unit and controlling the switching of the switching unit depending on the operating mode information; and a Bluetooth module transmitting and receiving data using Bluetooth communications.

The Bluetooth module may provide state information to an external device using Bluetooth communications in the reception mode and receive state information from an external device using Bluetooth communications in the transmission mode.

According to another aspect of the present disclosure, an apparatus for transmitting and receiving wireless power may include: a host part having a battery therein, setting an operating mode and transmitting or receiving data using Bluetooth communications with an external device depending on an operating mode; and a wireless power transmission/reception part receiving power from an external device using magnetic resonance to charge the battery if the operating mode is a reception mode and transmitting power from the battery to the external device using magnetic resonance if the operating mode is a transmission mode.

The wireless power transmission/reception part may include: a resonant coil unit transmitting the power to and receiving the power from an external device using magnetic resonance; a reception module receiving the power from the external device using magnetic resonance in the reception mode; a transmission module providing the power to the external device using magnetic resonance in the transmission mode; a switching unit performing switching so that the reception module or the transmission module is selected; and a switching control unit controlling switching of the switching unit depending on the operating mode.

The switching control unit may include: a Bluetooth module transmitting and receiving data to and from an external device using Bluetooth communications; and a control unit controlling the switching of the switching unit depending on the operating mode and controlling a mode of the Bluetooth module depending on the operating mode, wherein the control unit sets the Bluetooth module to a master mode if the operating mode is the transmission mode and sets the Bluetooth module to a slave mode if the operating mode is the reception mode.

The Bluetooth module may receive state information from an external device using Bluetooth communications if the Bluetooth module is in the master mode and may provide state information to an external device using Bluetooth communications if the Bluetooth module is in the slave mode.

The reception module may include: a rectifier rectifying the power received from the resonant coil unit; and a converter unit converting the power provided from the rectifier into an output voltage so as to provide the power to the battery.

The transmission module may include an amplifier amplifying the power provided from the battery.

The apparatus may further include: a matching circuit unit disposed between the switching unit and the resonant coil unit, the matching circuit unit adjusting impedance of the power provided from the resonant coil unit to provide the power to the reception module or adjusting impedance of the power provided from the transmission module to provide the power to the resonant coil unit.

The reception mode may be set to be a default mode of the operating mode.

The host part may include: the battery; a power management module controlling power to be supplied to the battery; and a host control unit setting the operating mode.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
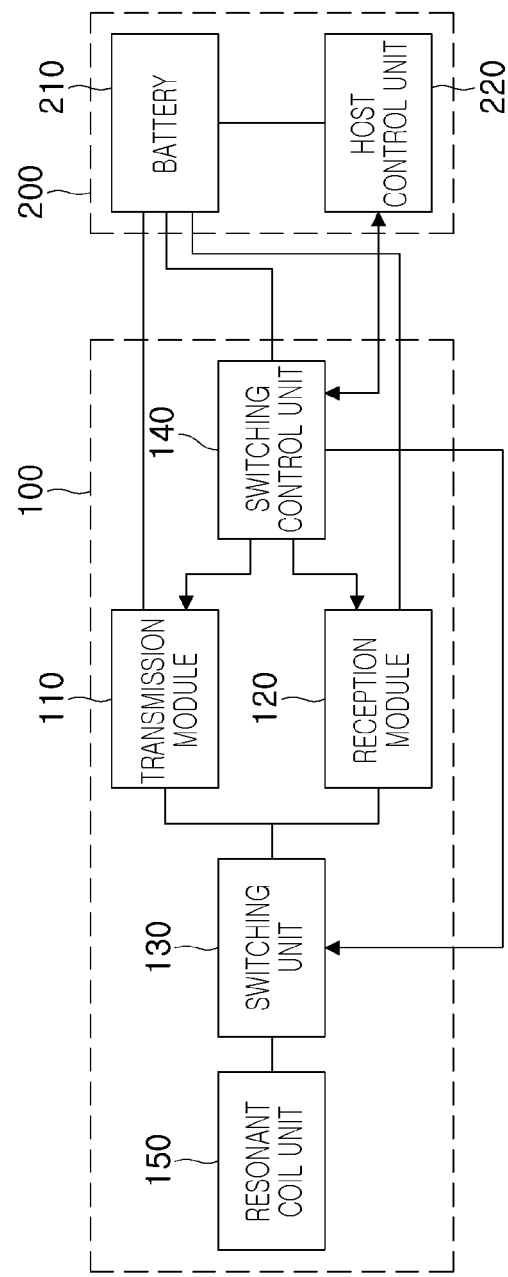
FIG. 1 is a block diagram of an apparatus for wirelessly transmitting and receiving power according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram of an apparatus for transmitting and receiving wireless power according to an exemplary embodiment of the present disclosure.

Referring to FIG. 1, the apparatus for transmitting and receiving wireless power according to the exemplary embodiment may include a wireless power transmission/reception part 100 and a host part 200.

The wireless power transmission/reception part 100 may include a transmission module 110, a reception module 120, a switching unit 130, a switching control unit 140, and a resonant coil unit 150.

The host part 200 may include a battery 210 and a host control unit 220.

First, the elements of the wireless power transmission/reception part 100 will be described.

The reception module 120 may receive power from an external device to supply it so that the battery 210 is charged. The external device which provides power may refer to a transmission device near the apparatus for transmitting and receiving wireless power according to the exemplary embodiment, and the battery 210 may be a battery used in a portable wireless terminal.

The reception module 120 may charge the battery 210 with the power from the external device using magnetic resonance. The magnetic resonance may conform to the alliance for wireless power (A4WP) standard.

The transmission module 110 may provide power from the battery 120 to an external device. The external device may refer to a reception device near the apparatus for transmitting and receiving wireless power according to the exemplary embodiment.

The switching unit 130 may be disposed between the resonant coil unit 150 and the transmission module 110 and between the resonant coil unit and the reception module 120. In addition, the switching unit 130 may perform switching so that the transmission module 110 or the reception module 120 is selected. A control signal for the switching may be provided from the switching control unit 140.

That is, the switching unit 130 may perform switching according to the control signal provided from the switching control unit 140 so that the transmission module 110 or the reception module 120 is selected depending on an operating mode.

The switching unit 140 may be connected to the transmission module 100 and to the reception module 200 and may control the switching of the switching unit 130. The switching control unit 140 may create the control signal so as to select the transmission module 110 or the reception module 120 depending on the operating mode.

Information on the operating mode may be provided from the host control unit 220 of the host part 200. That is, the switching control unit 140 may learn that the current operating mode is a transmission mode or a reception mode based on the information on the operating mode provided from the host control unit 220. If the current operating mode is the transmission mode, the switching control unit 140 may control the switching of the switching unit 130 so that the transmission module 110 is selected. If the current operating mode is the reception mode, the switching control unit 140 may control the switching of the switching unit 130 so that the reception module 120 is selected.

Further, the switching control unit 140 may perform Bluetooth communications with an external device. By performing the communications, the switching control unit 140 may provide state information with respect thereto to the external device and may receive state information of an external device. The state information may include the current state of Bluetooth communications, battery information and the like. Based on the information, the host control unit 220 may set the operating mode and may determine whether transmission and reception can be performed.

Further, the host control unit 220 may check the state of wireless communications with an adjacent device and may also check the current state of the battery 210. Accordingly, it can be determined whether the apparatus for transmitting and receiving wireless power according to the exemplary embodiment is to be operated in the transmission mode or in the reception mode. After the determining, the operating mode is set to be the transmission mode or the reception mode. The switching control unit 140 may control the switching of the switching unit 130 so that the transmission module 110 or the reception module 120 is selected depending on the operating mode.

The apparatus for transmitting and receiving wireless power according to the exemplary embodiment may further include the resonant coil unit 150 that receives power from the external device using magnetic resonance or provides power to the external device using magnetic resonance.

That is, if the operating mode of the apparatus for transmitting and receiving wireless power is the transmission mode, the switching control unit 140 may control the switching of the switching unit 130 so that power stored in the battery 210 is provided to an external reception device via the transmission module 110 and the resonant coil unit 150.

In addition, if the operating mode of the apparatus for transmitting and receiving wireless power is the reception mode, the switching control unit 140 may control the switching of the switching unit 130 so that power from an external transmission device is provided to the battery 210 via the resonant coil unit 150 and the reception module 120.

The apparatus for transmitting and receiving wireless power illustrated in FIG. 1 will be described in more detail with respect to FIG. 2.

Figure 2:
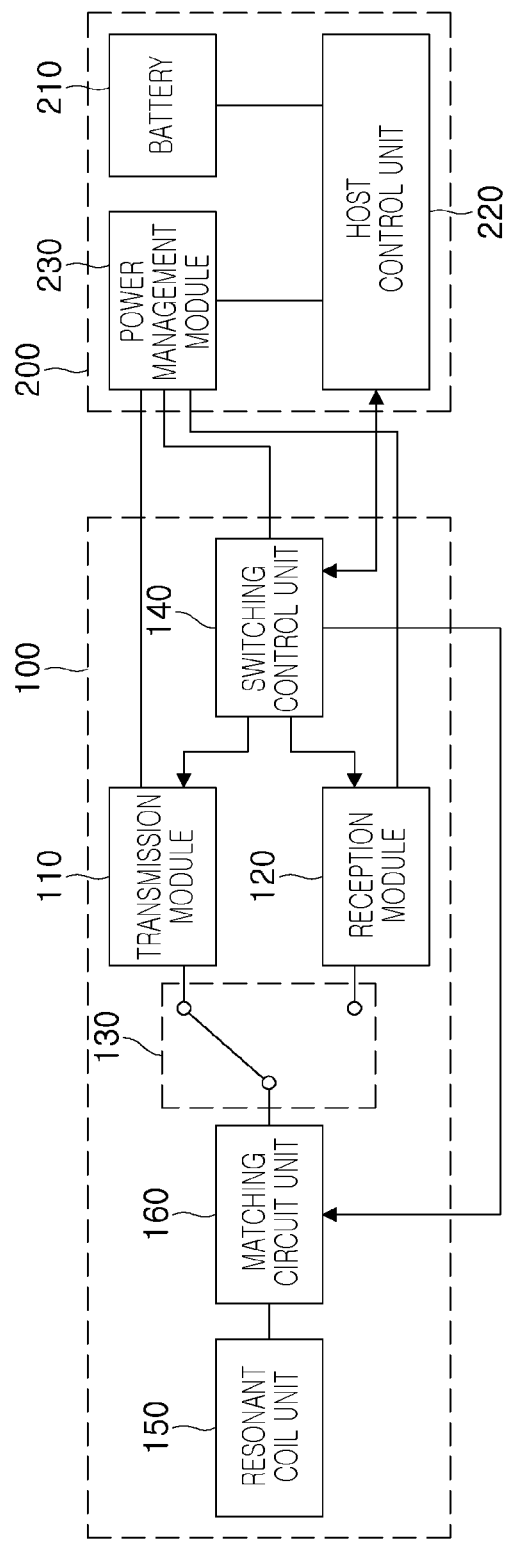
FIG. 2 is a block diagram illustrating in more detail the apparatus for transmitting and receiving wireless power illustrated in FIG. 1.

FIG. 2 is a block diagram illustrating in more detail the apparatus for transmitting and receiving wireless power illustrated in FIG. 1.

Referring to FIG. 2, the apparatus for transmitting and receiving wireless power may further include a matching circuit unit 160 disposed between the resonant coil unit 150 and the switching unit 130. In the reception mode, the matching circuit unit 160 may adjust impedance of the power provided from the resonant coil part 150 so as to provide the power to the reception module 120. In the transmission mode, the matching circuit unit 160 may adjust impedance of the power provided from the transmission module 110 so as to provide the power to the resonant coil part 150.

In addition, the host part 200 of the apparatus for transmitting and receiving wireless power may further include a power management module 230. The power management module 230 may be connected to the host control unit 220 and may control the power to be provided to the transmission module 110 or the power provided from the reception module 120.

Figure 3:
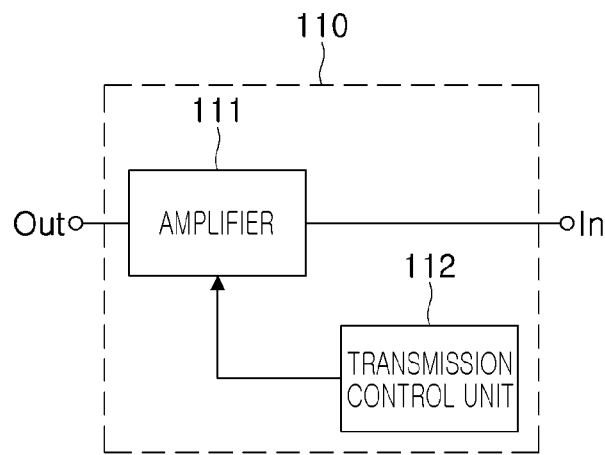
FIG. 3 is a block diagram of an example of the transmission module among the elements of the apparatus for transmitting and receiving wireless power illustrated in FIG. 1.

FIG. 3 is a block diagram of an example of the transmission module 110 among the elements of the apparatus for transmitting and receiving wireless power illustrated in FIG. 1.

Referring to FIG. 3, the transmission module 110 may include an amplifier 111 and a transmission control unit 112.

When the apparatus for transmitting and receiving wireless power is in the transmission mode, the transmission module 110 may receive power from the battery 210 so as to provide the power to an external reception device via the matching circuit unit 160 and the resonant coil unit 150.

The transmission module 110, under the control of the transmission control unit 112, may amplify the voltage level of the power received from the battery 210 using the amplifier 111 by a predetermined voltage level so as to provide the power to the matching circuit unit 160.

Figure 4:
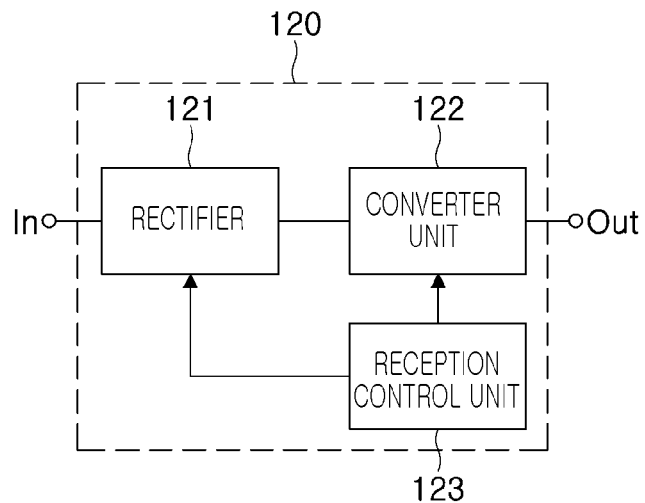
FIG. 4 is a block diagram of an example of the reception module among the elements of the apparatus for transmitting and receiving wireless power illustrated in FIG. 1.

FIG. 4 is a block diagram of an example of the reception module 120 among the elements of the apparatus for transmitting and receiving wireless power illustrated in FIG. 1.

Referring to FIG. 4, the reception module 120 may include a rectifier 121, a converter unit 122, and a reception control unit 123.

When the apparatus for transmitting and receiving wireless power is in the reception mode, the reception module 120 may receive power from an external transmission device via the resonant coil unit 150 and the matching circuit unit 160.

Then, the power provided from the external transmission device is rectified by the rectifier 121, and the rectified power is converted into an output voltage by the converter unit 122 so as to be provided to the battery 210. The reception control unit 123 may control the operations of the rectifier 121 and the converter unit 122.

Figure 5:
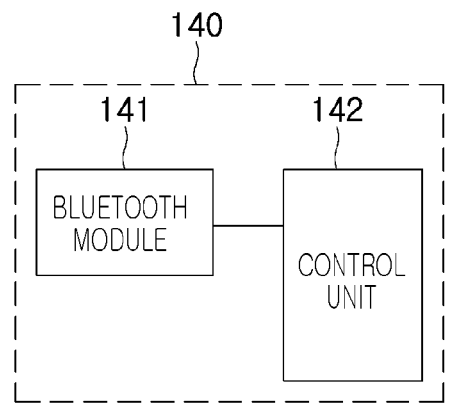
FIG. 5 is a block diagram of an example of the switching control unit among the elements of the apparatus for transmitting and receiving wireless power illustrated in FIG. 1.

FIG. 5 is a block diagram of an example of the switching control unit 140 among the elements of the apparatus for transmitting and receiving wireless power illustrated in FIG. 1.

Referring to FIG. 5, the switching control unit 140 may include a Bluetooth module 141 and a control unit 142. The Bluetooth module 141 may perform Bluetooth communications with an external device so as to transmit and receive data, which may be state information that includes battery information, for example.

This will be described in more detail below with reference to FIGS. 6 through 8.

Figure 6:
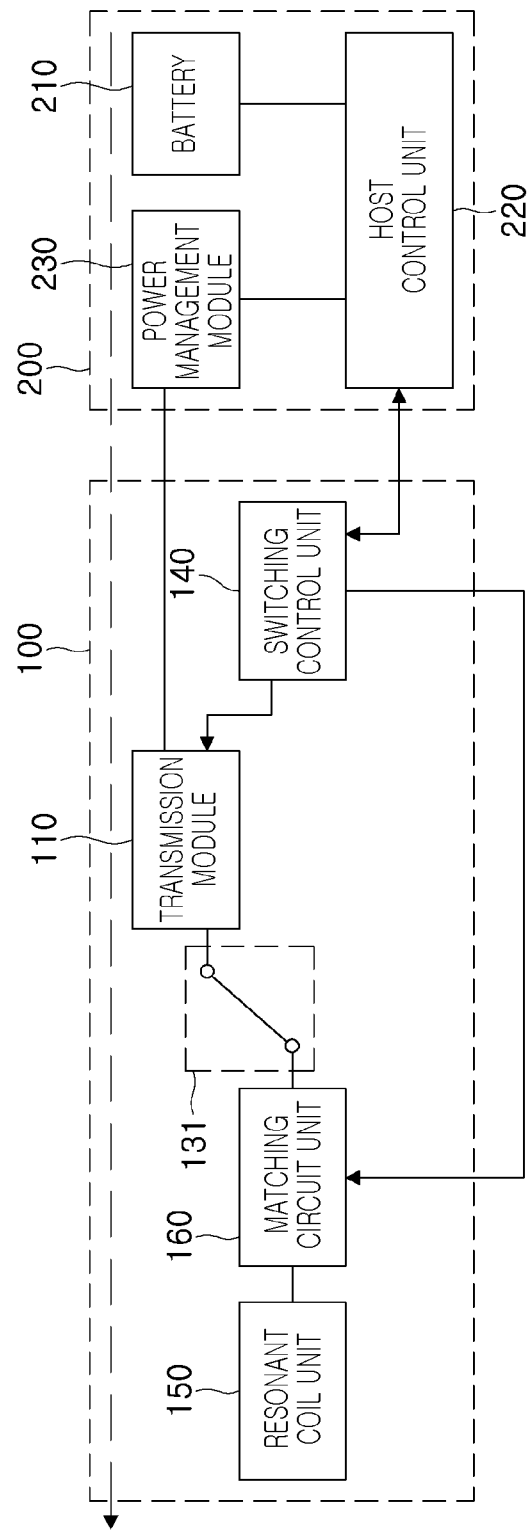
FIG. 6 is a block diagram for illustrating the operation of the apparatus for transmitting and receiving wireless power in the transmission mode, according to an exemplary embodiment of the present disclosure.

FIG. 6 is a block diagram for illustrating the operation of the apparatus for transmitting and receiving wireless power in the transmission mode, according to an exemplary embodiment of the present disclosure.

Figure 7:
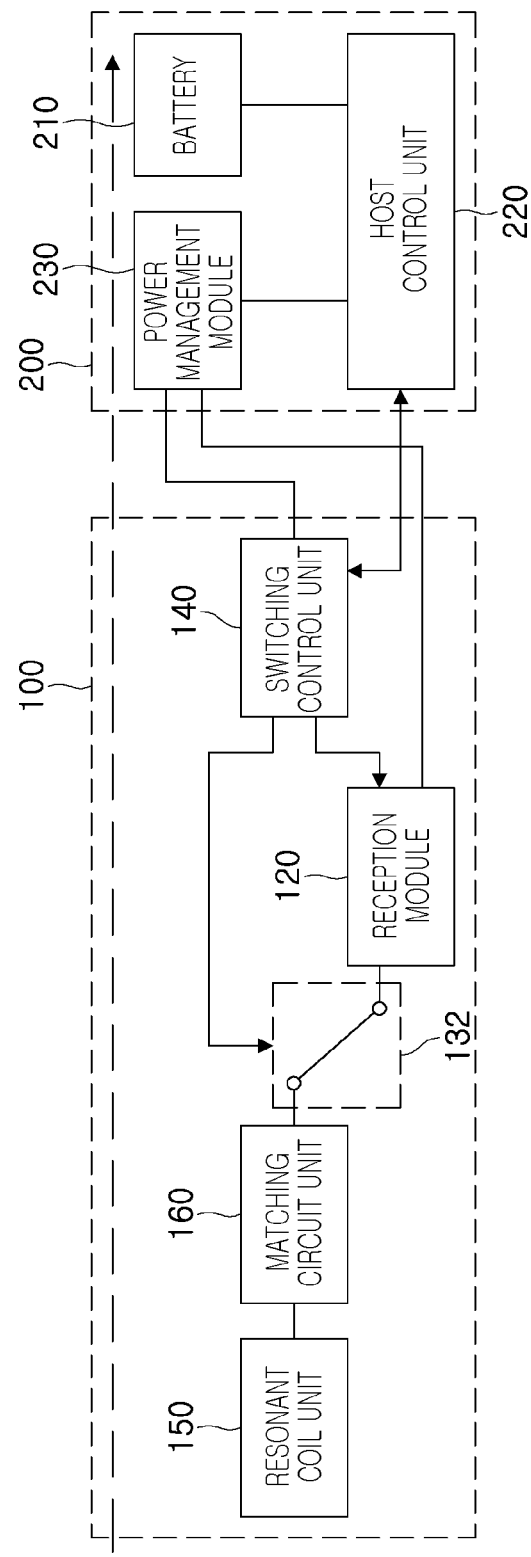
FIG. 7 is a block diagram for illustrating the operation of the apparatus for transmitting and receiving wireless power in the reception mode, according to an exemplary embodiment of the present disclosure.

FIG. 7 is a block diagram for illustrating the operation of the apparatus for transmitting and receiving wireless power in the reception mode, according to an exemplary embodiment of the present disclosure.

Figure 8:
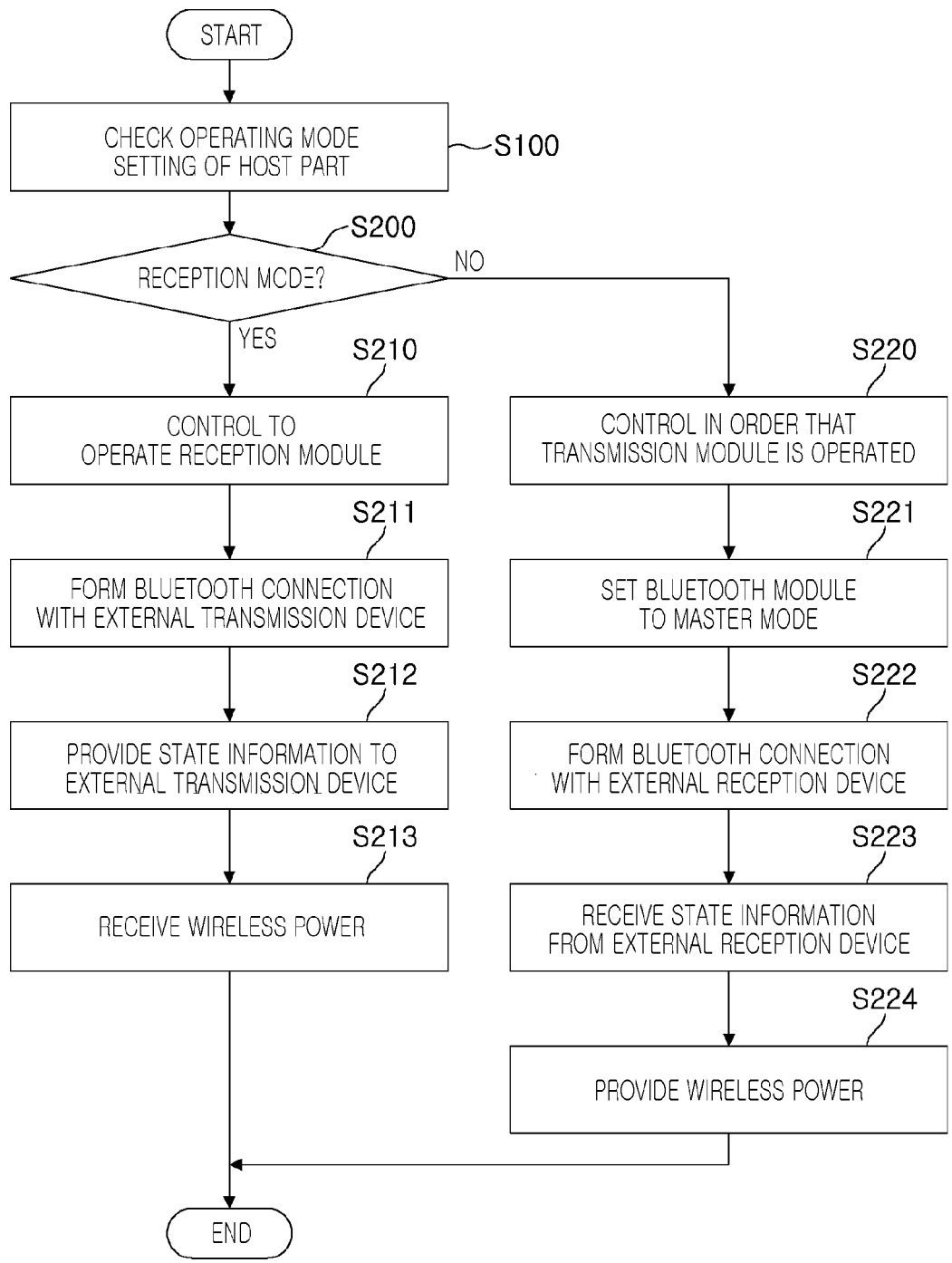
FIG. 8 is a flowchart for illustrating overall operations of an apparatus for wirelessly transmitting and receiving power according to an exemplary embodiment of the present disclosure.

FIG. 8 is a flowchart for illustrating overall operations of an apparatus for wirelessly transmitting and receiving power according to an exemplary embodiment of the present disclosure.

Referring to FIGS. 6 and 8, the operation of the apparatus for transmitting and receiving wireless power in the transmission mode will be described.

Initially, the switching control unit 140 may check whether the operating mode of the host control unit 220 is the transmission mode or the reception mode (S100).

In this regard, the host control unit 220 in the apparatus for transmitting and receiving wireless power may set the reception mode as the default mode (S200). If the operating mode is the transmission mode, the host control unit 220 may supply power to the switching control unit 140 first so that the transmission module 110 is operated (S220). Then, as the operating mode is set to the transmission mode, the switching control unit 140 may operate the Bluetooth module 141 in a master mode (S221). Then, the switching control unit 140 controls the switching of the switching unit 130 so that the transmission module 110 is connected to the matching circuit unit 160.

Then, the Bluetooth module 141 may create Bluetooth communications with an external reception device (S222). Then, state information may be provided from the external reception device, and the state information may be transmitted to the host control unit 220. In accordance with this, the transmission module 110 may transmit power using magnetic resonance depending on the state information from the external reception device (S224). A user of the apparatus for wirelessly transmitting and receiving power may select a desired Bluetooth service via the host part 200. The Bluetooth module 141 in the switching control unit 140 may perform Bluetooth communications with the external reception device to provide the desired Bluetooth service.

Now, referring to FIGS. 7 and 8, the operation of the apparatus for transmitting and receiving wireless power in the reception mode will be described.

Initially, the switching control unit 140 may check whether the operating mode of the host control unit 220 is the transmission mode or the reception mode (S100).

In this regard, the host control unit 220 in the apparatus for transmitting and receiving wireless power may set the reception mode as the default mode (S200).

If the operating mode is the reception mode, power may be provided from an external transmission device via the resonant coil unit 150 and the matching circuit unit 160. The switching control unit 140 may be operated by the provided power and may hold the switching of the switching unit 130 so that the reception mode is maintained unless anything particular occurs. In addition, the Bluetooth module 141 may be operated in a slave mode, which is the default mode. In addition, the switching control unit 140 may be connected to an external device using Bluetooth communications (S211).

Further, the Bluetooth module 141 may provide the external transmission device with state information on the apparatus for transmitting and receiving wireless power (S222).

Then, the apparatus for transmitting and receiving wireless power may receive power from an external transmission device using magnetic resonance (S213), and may charge the battery 210 with the received power.

As set forth above, according to exemplary embodiments of the present disclosure, wireless power can be both transmitted and received. Further, bridging to perform wireless communications with an adjacent device is provided so that various services can be provided to a user, thereby improving user convenience.

While exemplary embodiments have been shown and described above, it will be apparent to those skilled in the art that modifications and variations could be made without departing from the spirit and scope of the present disclosure as defined by the appended claims.

What is claimed is:

1. An apparatus for transmitting and receiving wireless power, comprising:
a reception module receiving power from an external device to charge a battery;
a transmission module providing power from the battery to the external device;
a switching unit performing switching so as to select the transmission module or the reception module;
a switching control unit including
a control unit checking the operating mode information received from the host control unit and controlling the switching of the switching unit depending on the operating mode information, and
a Bluetooth module transmitting and receiving data using Bluetooth communications; and
a host control unit creating operating mode information so as to provide the operating mode information to the switching control unit,
wherein the operating mode comprises a transmission mode in which the power is received from the external device to charge the battery and a reception mode in which the power from the battery is provided to the external device,
wherein the switching control unit sets the Bluetooth module to a master mode if the operating mode is the transmission mode or sets the Bluetooth module to a slave mode if the operating mode is the reception mode,
wherein the reception mode and the slave mode are set to be a default mode.

2. The apparatus of claim 1, further comprising a resonant coil unit receiving power from the external device or transmitting power to the external device using magnetic resonance.

3. The apparatus of claim 2, further comprising a matching circuit unit disposed between the switching unit and the resonant coil unit, the matching circuit unit adjusting impedance of the power provided from the resonant coil unit to provide the power to the reception module or adjusting impedance of the power provided from the transmission module to provide the power to the resonant coil unit.

4. The apparatus of claim 1, wherein the reception module receives power from the external device using magnetic resonance, and the transmission module provides power to the external device using magnetic resonance.

5. The apparatus of claim 1, wherein the Bluetooth module provides state information to the external device using
Bluetooth communications in the reception mode and receives state information from the external device using Bluetooth communications in the transmission mode.

6. An apparatus for transmitting and receiving wireless power, comprising:
a host part having a battery therein, setting an operating mode and transmitting or receiving data using Bluetooth communications with an external device depending on the operating mode; and
a wireless power transmission/reception part receiving power from the external device using magnetic resonance to charge the battery if the operating mode is a reception mode and transmitting power from the battery to the external device using magnetic resonance if the operating mode is a transmission mode,
wherein the wireless power transmission/reception part includes:
a resonant coil unit transmitting the power to and receiving the power from an the external device using magnetic resonance;
a reception module receiving the power from the external device using magnetic resonance in the reception mode;
a transmission module providing the power to the external device using magnetic resonance in the transmission mode;
a switching unit performing switching so that the reception module or the transmission module is selected; and
a switching control unit including
a control unit checking the operating mode information received from the host control unit and controlling the switching of the switching unit depending on the operating mode information, and
a Bluetooth module transmitting and receiving data using Bluetooth communications; and
a host control unit creating operating mode information so as to provide the operating mode information to the switching control unit, wherein the operating mode comprises a transmission mode in which the power is received from the external device to charge the battery and a reception mode in which the power from the battery is provided to the external device,
wherein the switching control unit sets the Bluetooth module to a master mode it the operating mode is the transmission mode or sets the Bluetooth module to a slave mode if the operating mode is the reception mode,
wherein the reception mode and the slave mode are set to be a default mode.

7. The apparatus of claim 6, wherein the Bluetooth module receives state information from the external device using Bluetooth communications if the Bluetooth module is in the master mode and provides state information to the external device using Bluetooth communications if the Bluetooth module is in the slave mode.

8. The apparatus of claim 6, wherein the reception module includes:
a rectifier rectifying the power received from the resonant coil unit; and
a converter unit converting the power provided from the rectifier into an output voltage so as to provide the power to
the battery.

9. The apparatus of claim 6, wherein the transmission module includes an amplifier amplifying the power provided from the battery.

10. The apparatus of claim 6, further comprising a matching circuit unit disposed between the switching unit and the resonant coil unit, the matching circuit unit adjusting impedance of the power provided from the resonant coil unit to provide the power to the reception module or adjusting impedance of the power provided from the transmission module to provide the power to the resonant coil unit.

11. The apparatus of claim 6, wherein the host part includes:
the battery;
a power management module controlling power to be supplied to the battery; and the host control unit setting the operating mode.

* * * * *